United States Patent [19]
Wayson

[11] 3,711,166
[45] Jan. 16, 1973

[54] MEANS FOR CONTROLLING THE COEFFICIENT OF FRICTION BETWEEN BEARING SURFACES

[75] Inventor: Andrew J. Wayson, Needham, Mass.

[73] Assignee: Merriman, Inc. Hingham, Mass.

[22] Filed: March 3, 1971

[21] Appl. No.: 120,659

Related U.S. Application Data

[63] Continuation-in-part of Ser. No. 766,503, Oct. 10, 1968, abandoned.

[52] U.S. Cl....................308/3, 308/DIG. 7, 308/238
[51] Int. Cl..............................................F16c 17/00
[58] Field of Search..........308/2 R, 3 R, DIG. 7, 237, 308/238, 239; 14/16

[56] References Cited

UNITED STATES PATENTS

| | | | |
|---|---|---|---|
| 3,436,129 | 4/1969 | James | 308/3 R |
| 2,330,635 | 9/1943 | Siebel | 308/DIG. 7 |
| 3,138,413 | 6/1964 | Woody | 308/DIG. 7 |

FOREIGN PATENTS OR APPLICATIONS

| | | | |
|---|---|---|---|
| 961,823 | 6/1964 | Great Britain | 308/DIG. 7 |

*Primary Examiner*—Milton Kaufman
*Assistant Examiner*—R. H. Lazarus
*Attorney*—Chittick, Pfund, Birch, Samuels & Gauthier

[57] ABSTRACT

A self-lubricated pressure plate or journal for use in supporting relatively slowly moving heavy loads of the type imposed, for example, by long structural members such as beams which expand and contract under temperature changes. A fabricated sheet made of material which has the inherent capability of lowering the coefficient of friction as the pressure thereagainst is increased, rests against a first plate of novel surface configuration whereby the sheet, when under pressure by a smooth second plate, will provide a suitable sliding surface for the second plate and will be effectively secured without bonding against sliding movement with respect to the first plate. The first plate has raised or depressed areas of controlled size against which the load acting through the fabricated sheet principally bears resulting in a controlled and lower coefficient of friction at these bearing areas.

25 Claims, 21 Drawing Figures

PATENTED JAN 16 1973 3,711,166

Inventor:
Andrew J. Wayson,
by
Chittick, Pfund, Birch, Samuels & Gauthier Attorneys

PATENTED JAN 16 1973

Inventor:
Andrew J. Wayson,
by
Chittick, Pfund, Birch, Samuels & Gauthier Attorneys

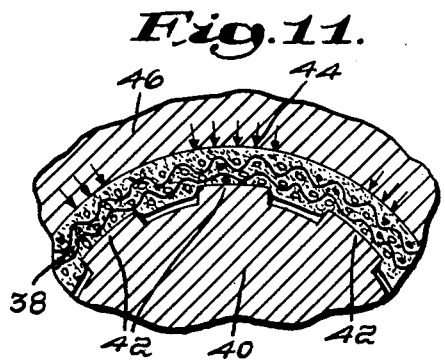
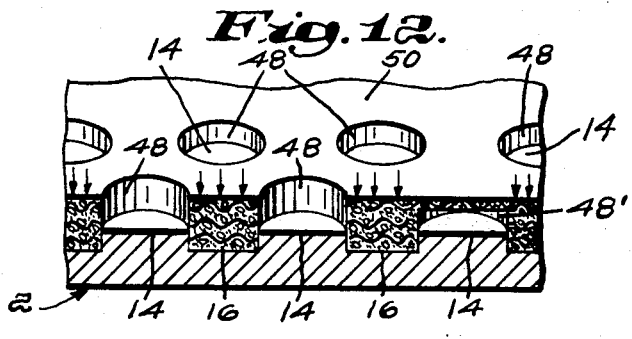
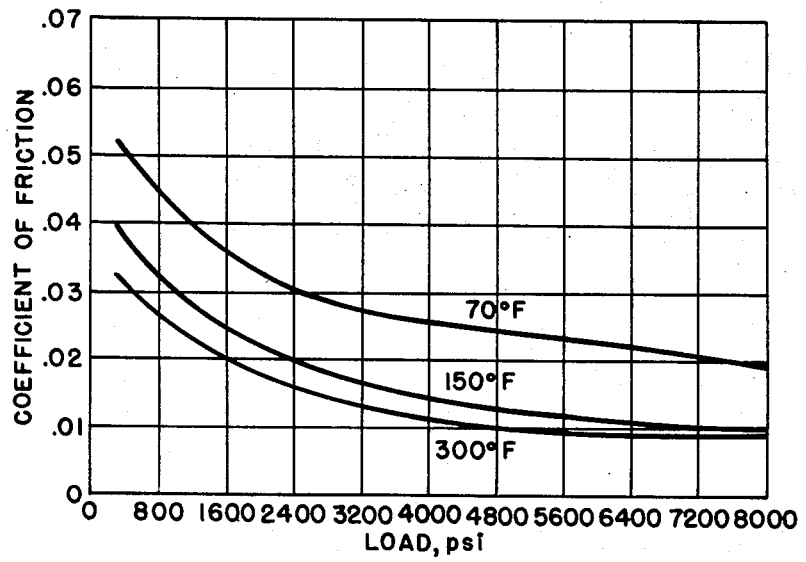
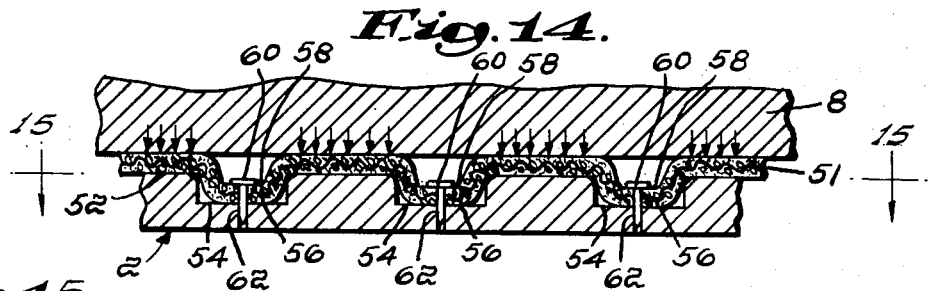
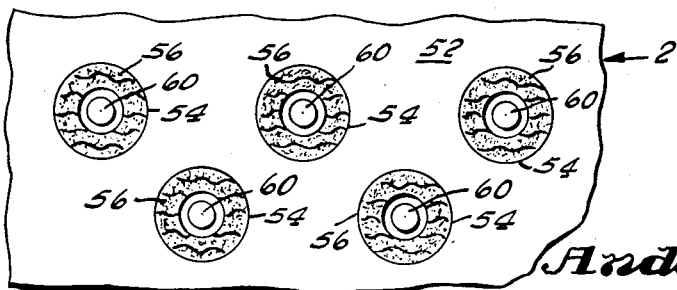

Inventor:
Andrew J. Wayson,
by Chittick, Pfund, Birch, Samuels & Gauthier
Attorneys

MEANS FOR CONTROLLING THE COEFFICIENT OF FRICTION BETWEEN BEARING SURFACES

CROSS-REFERENCE TO RELATED APPLICATIONS

This application is a continuation-in-part of the application of Andrew J. Wayson, U.S. Ser. No. 766,503, filed Oct. 10, 1968, now abandoned, for MEANS FOR CONTROLLING THE COEFFICIENT OF FRICTION BETWEEN BEARING SURFACES.

BACKGROUND OF THE INVENTION

Pressure plates for supporting heavy slowly moving loads such as expansible beams are well known and many different forms have been devised and put to use. See the early U.S. Pat. to Merriman, No. 2,187,626 and the improvement in Milk U.S. Pat. No. 3,105,252. Another type of bearing carrying a slowly moving load is that found in coupling such as, for example, the so-called fifth wheel of a truck trailer rig.

Since the development of TFE-fluorocarbon fibers by the du Pont Company (sold under the trademark "Teflon"), attempts have been made to take advantage of its low and controllable frictional characteristics in the general field of heavily loaded supports. See the prior art classified in the U.S. Patent Office in Class 14 subclass 16 and Class 308 subclasses 3, 237, 238, 239 and 241, and particularly the following patents:

| United States | Great Britain | Germany |
| --- | --- | --- |
| 1,940,302 | 657,080 | 832,679 |
| 2,121,277 | 731,348 | DAS 1.263.805 |
| 2,187,626 | 876,069 | 116 0873 |
| 2,815,253 | 945,300 | 119 9305 |
| 2,851,289 | 961,823 | 120 2813 |
| 2,919,956 | 976,069 | 123 3426 |
| 3,033.623 | | 126 3805 |
| 3,068,053 | | |
| 3,105,252 | | |
| 3,243,236 | | |
| 3,376,082 | | |
| 3,397,856 | | |
| 3,436,129 | | |

SUMMARY

The present invention contemplates using a fabricated sheet of "Teflon" or other materials of similar characteristics as one of the supporting elements. One surface of the sheet will be engaged by a cooperating smooth surface of a plate of metal or other suitable material and the relative movement will be between these two surfaces. The other side of the fabricated sheet will be engaged by another plate having elements extending toward the sheet a limited distance about the surrounding adjacent surface (in most forms of the invention the other plate having the limited supporting areas that interlock with the sheet is underneath the sheet although as far as the invention is concerned, the parts could be inverted with the smooth plate below and the other plate above and the same result obtained). These raised elements of the base plate which might be described as short posts may be in plan circular, longitudinal or otherwise and have flat, concave or convex surfaces and present a total area sufficient to support the load without damage to the sheet although the sheet will be appreciably compressed at these raised areas with negligible lateral spreading movement of the compressed portion.

The other areas of the fabricated sheet not resting on the short posts may or may not support a portion of the load depending upon the height of the posts above the surrounding floor of the base plate. Preferably, it is contemplated that the posts will support all the load to produce thereby the desired coefficient of friction and the extent to which the posts enter the sheet will be enough to insure anchoring of the sheet to the plate to prevent lateral shifting of the sheet on the base plate. The ability to vary the areas of the posts carrying the load while maintaining the overall dimensions of the supporting plate, provides the necessary stability and the desired coefficient of friction.

In a modified form, the fabricated sheet will have complete or partial openings therethrough which are located to receive therein the posts of the base plate. The sheet in this form is thicker than the height of the posts so that when the load is applied to the sheet, the compressed sheet will bear on the lower areas of the base plate surrounding the posts. The load plate will not touch the posts, nor will the material of the sheet above the posts (assuming that the openings in the sheet do not extend completely therethrough) be compressed thereagainst. The posts, however, act to anchor the compressed sheet against lateral movement with respect to the base plate.

In either construction, the compressed area of the sheet, whether against the posts or against the lower area surrounding the posts, can be varied at will so that with a known load, the pounds per square inch pressure on the fabricated sheet may be controlled to give the desired coefficient of friction.

The fabricated sheet of "Teflon" or comparable material may be preferably in the form of a woven or knitted web, a felted sheet or a sheet otherwise made of "Teflon" TFE or similar fibers either staple or continuous filament, as distinguished from a solid rolled, poured, extruded or cast sheet of "Teflon" resin or the like. To maintain this distinction, the sheet throughout the specification and claims is referred to as a fabricated sheet. The fabricated sheet due to its construction has the desired compressibility but strongly resists lateral expansion under load.

As will be seen from an inspection of a graph shown in the drawings and referred to hereinafter, a sheet made of TFE-fluorocarbon (polytetrafluoroethylene) fibers even when unlubricated has a coefficient of friction lower than lubricated metal to metal bearings. The coefficient of friction of TFE fibers decreases substantially with an increase in load. Since TFE fibers, as distinguished from products made of "Teflon" resin, are capable of carrying loads as high as 60,000 psi without cold flow, the desirability of using high loading on the fabricated sheet of TFE fibers to obtain a lower coefficient of friction is apparent.

BRIEF DESCRIPTION OF THE DRAWINGS

FIG. 11 shows the application of the invention to a curved bearing surface.

FIG. 12 shows a modification in which the fabricated sheet has holes extending wholly or partially therethrough to receive the raised posts and the pressure is applied to the entire remaining upper surface of the fabricated sheet and is carried by the lower areas of the base plate surrounding the posts.

FIG. 13 is a graph showing the characteristics of the fibers under varying loads and temperature.

FIG. 14 is a modification of the construction shown in FIGS. 1, 2 and 3.

FIG. 15 is a plan view taken on the line 15—15 of FIG. 14.

DESCRIPTION OF THE PREFERRED EMBODIMENT

Figure 1:
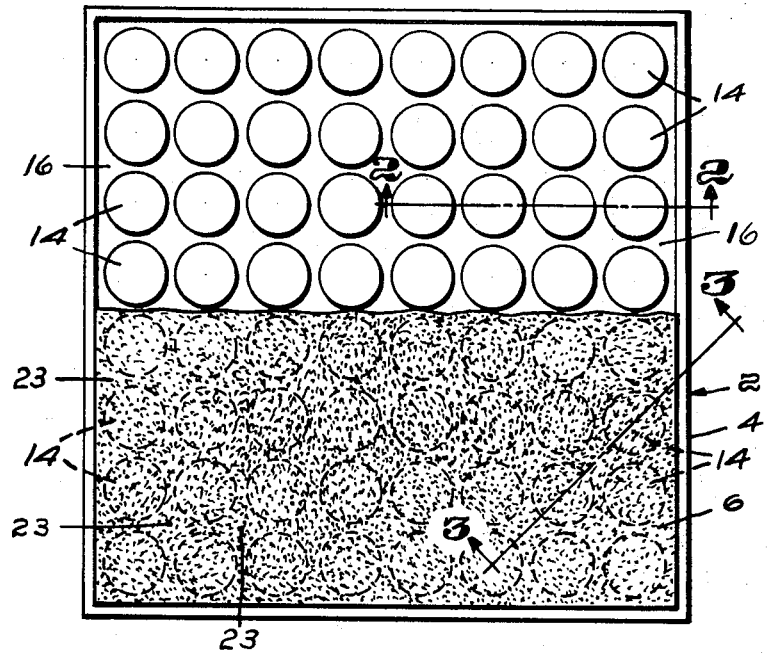
FIG. 1 is a plan view of a sheet supporting plate of any dimension showing the raised areas or posts to be circular and flat on their upper surfaces. The upper half of the figure shows the plate uncovered. The lower half shows the plate covered with a fabricated sheet.
Figure 2:
FIG. 2 is a vertical section on the line 2—2 of FIG. 1.
Figure 3:
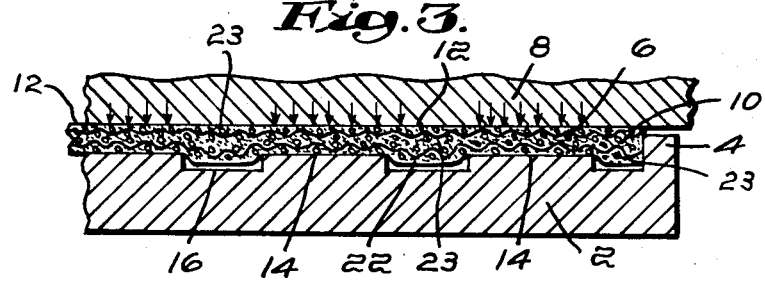
FIG. 3 is a vertical section on the line 3—3 of FIG. 1 showing the sheet compressed over the posts and forced downward into anchored position between the posts by a superimposed load carrying pressure plate.

The invention in its preferred embodiment is shown in FIGS. 1, 2 and 3. FIG. 1 shows a supporting base plate 2 of any selected area determined by stability requirements, and by the load to be carried and the desired coefficient of friction between the sliding surfaces. A wall 4 preferably surrounds the plate to aid in locating the fabricated sheet which is engaged by the superimposed load which may be in the form of a steel plate 8 having a smooth underside 10 adapted to slide on the upper surface 12 of the fabricated sheet 6.

The upper surface of base plate 2 is covered preferably in regular formation by a large number of short posts 14 separated from each other on the lower floor 16. The total area of the top surfaces of the posts may vary considerably in relation to the total area of the base plate but in general may be between 40 and 60 percent but not limited thereto. The walls 18 of the posts 14 are preferably more or less vertical to present a more or less sharp edge 20 which tends to improve the ability of the posts to anchor the fabricated sheet 6 against horizontal movement when the load 8 is applied. As disclosed in FIGs. 1, 2 and 3, the top surface areas of the posts 14 lie in a common plane.

On the other hand, when the area of the posts 14 or their equivalents is reduced so that the load per square inch on the compressed parts of the sheet is increased, then the sides of the posts, ribs or other raised configurations including hemispherical shapes need not be so steep as the raised portions will more readily enter the sheet to give the required locking action.

The fabricated sheet 6 in its preferred form is that of a thick woven belt similar in construction to that commonly used for belt drives, but made of "Teflon" or equivalent threads. Such material cut to proper size for placement on plate 2 and resting on the upper surfaces of posts 14 will give the required low frictional sliding support for the load 8. When large supporting areas are needed, the fabricated sheet may be of two or more pieces side by side.

When the load 8 is applied as shown in FIG. 3, the posts 14 will be forced up into the underside 22 of fabricated sheet 6 thereby placing the load on the areas of the posts 14 with little pressure being applied to the areas of the fabricated sheets above the floor 16. The arrows in FIG. 3 are to indicate that the load is being carried almost entirely by the areas of the sheet 6 above the posts 14 and not by the adjacent unsupported areas above the floor 16. The load carrying areas of the posts are sufficiently spaced in relation to the thickness of the sheet so that the compressed load carrying areas of the sheet are substantially equal to the areas of the supporting posts. That is to say, the supporting effect of the posts does not fan out laterally to give anything even approaching uniform loading over the entire area of the sheet as, for example, would be the case with closely spaced posts and a relatively thick sheet. As the areas of the fabricated sheet 6 above the posts 14 are compressed, the undersides 22 of the uncompressed areas 23 descend into the spaces between the posts 14 as can be seen in FIG. 3 thereby anchoring the fabricated sheet 6 against lateral movement with respect to base plate 2. It will be understood that no bonding of the fabricated sheet to plate 2 is required to hold the sheet laterally in position once the load has been applied.

From the foregoing, it will be appreciated that the loaded areas represented by the upper surfaces of the posts 14 may readily be increased or decreased in dimension to produce the desired loading in terms of pounds per square inch to give the optimum coefficient of friction in the light of the total load and the penetration capability of the posts 14 into the fabricated sheet.

The various structural formations of the base plates shown in FIGS. 4 to 19 are illustrative but not limiting as to the configuration of anchoring means which may be varied to produce total areas subject to the load to give the higher or lower pressures per square inch needed to create the required coefficient of friction obtainable from the known "Teflon" characteristics.

Figure 4:
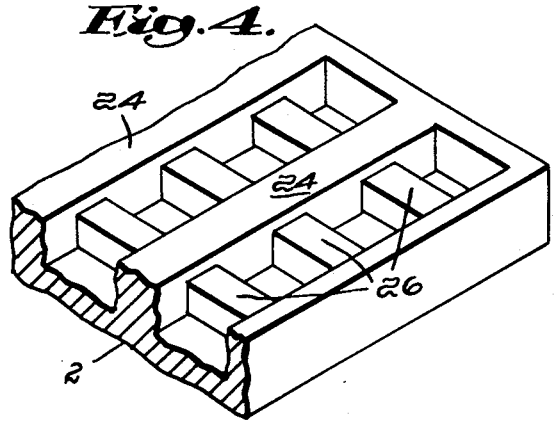
FIG. 4 shows a modification of the supporting and anchoring plate in perspective in which the principal load carrying areas are in the form of parallel continuous surfaces.

FIG. 4 shows a convenient form produced by casting the base plate (usually bronze or brass) whereby the cross bars 24 lying in a common plane may be varied in area and the secondary depressed areas 26 also lying in another common plane may, if desired, be but a small distance below the surfaces 24 to receive limited loading thereby to minimize wear in cases where high frequency of load movement occurs. Unloaded and uncompressed areas of the sheet remain over the spaces between areas 26. The sheet, where it rests on cross bars 24, will be under greater unit pressure than where it rests on the lower areas 26, but the two supporting areas together give the same average frictional effect as if the areas were in a common plane.

Figure 5:
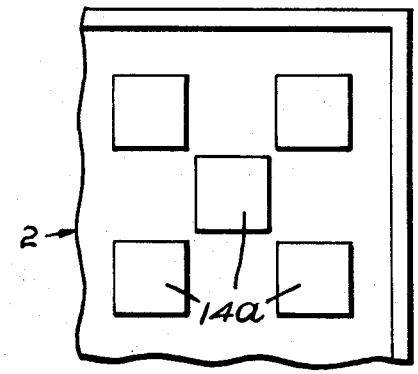
FIG. 5 is another modification showing in plan rectangular load carrying areas.

FIG. 5 is a modification of FIGS. 1, 2 and 3 utilizing square or rectangular posts 14a instead of circular posts. FIGS. 1, 2, 3 and 5 indicate that the posts in cross section may assume any desired shape, but the upper load supporting surfaces lie in a common plane.

Figure 6:
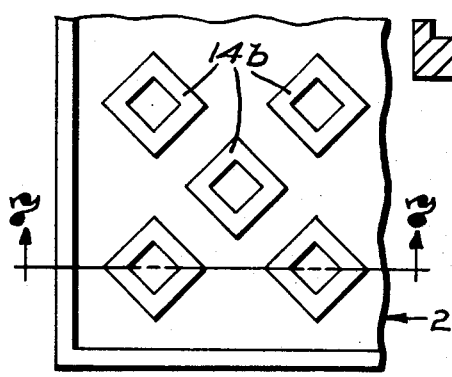
FIg. 6 is another modification in plan in which the raised load carrying areas are recessed at the center.
Figure 7:
FIG. 7 is a vertical section on the line 7—7 of FIG. 6.

FIGS. 6 and 7 show square posts 14b, of uniform height, each having a shallow recess in its upper surface. This recess does two things; it decreases the loading area and increases the ability of the posts to lock themselves into the underside of the fabricated sheet without damage to the latter. The load supporting surfaces lie in a common plane.

Figure 8:
FIG. 8 is still another alternative showing the manner in which the posts can be dished on their upper surfaces to improve the lateral locking effect on the fabricated sheet while still giving the required area to produce the coefficient of friction desired.

FIG. 8 shows posts 14c of uniform height and having any desired shape in plan in which the top surface is dished more or less as at 26. This achieves much the same result as the construction of FIGS. 6 and 7 in that the locking effect is helped without changing the loading of the top areas of the posts unduly and limits the cold flow action. The upper surfaces of posts 14c which are of uniform height may be considered as lying in a common plane.

Figure 9:
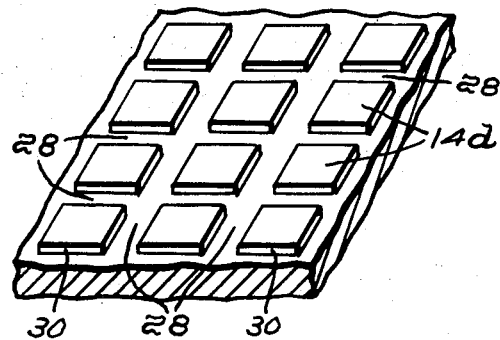
FIG. 9 is still another modification shown in perspective of the base plate which will supply the required supporting areas and act to hold the sheet in place.

FIG. 9 shows a base plate in a form which may readily be produced by machining. This method enables the designer to change the supporting areas easily by varying the number and width of grooves 28. Also, the height of the posts 14d and the slope of the post walls 30 to vary somewhat the locking effect on the particular fabricated sheet material used may be changed at will. The load supporting surfaces lie in a common plane.

Figure 10:
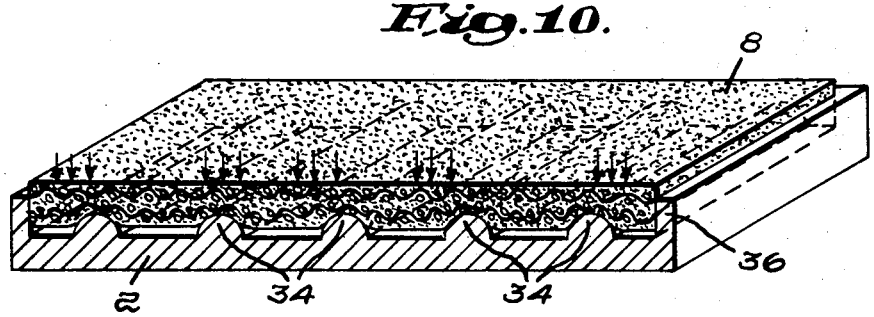
FIG. 10 shows still another form of supporting plate shown in perspective in which the load supporting ribs are at right angles to the direction of movement of the load. The sheet has been compressed by the load over the ribs. The load plate has been omitted for clarity.

FIG. 10 shows another form of base plate 2 in which crosswise extending ribs 34 are used as the anchoring means for the fabricated sheet 8. The sheet has been compressed by the load plate over the ribs 34. The surrounding wall 36 assists in holding the fabricated sheet in place on the base plate. By varying the number and configuration of the ribs (semicircular, triangular, semi-oval, flat on top, etc.) the effective loading per square inch on the compressed areas of sheet 8 and resulting coefficient of friction may be controlled. The incremental supporting areas do not lie in a common plane and the compression of the sheet varies from a maximum at the high points of the ribs to zero at the sides.

FIG. 11 shows how the invention may be used in any type of curved bearing, whether cylindrical, spherical, or any other non-planar form. The fabricated sheet 38 is anchored on one side by the bearing base plate 40 having the posts 42 whose load bearing surfaces lie in a common cylindrical surface while the other side of the fabricated sheet 38 is in sliding engagement with the smooth surface 44 of the other bearing plate 46. In any non-planar bearing, it is contemplated that the loading will be relatively large and the movement relatively slow, the same as in the other disclosed species. The load must be sufficiently great to compress the fabricated sheet between the posts 42 and the surface bearing plate 46 with the unsupported parts of sheet 38 entering into the lower areas adjacent posts 42 to anchor the sheet against movement on base plate 40. This construction is the same in principle as that shown in FIGS. 1, 2 and 3.

FIG. 12 shows a modification in which the load carrying areas of the base plate 2 are reversed. This is accomplished by punching or otherwise creating holes 48 or partial openings 48' in the fabricated sheet 50. The posts 14 enter the holes so that the fabricated sheet rests on the flat continuous bottom 16 of plate 2. When the movable load is applied to the upper surface of fabricated sheet 50, it will be compressed over the total continuous area 16, but the extent of the compression will not be such as to bring the load plate or the sheet 50 into engagement with the top of posts 14. The posts 14, of course, effectively anchor fabricated sheet 50 against any horizontal movement with respect to base 2.

FIG. 12 is fully as effective as a means for varying the supporting and compressed area of the fabricated sheet whereby the desired coefficient of friction may be achieved. However, the necessity of creating the holes or other depressions in the fabricated sheet 50 in which the posts 14 may reside but remain unloaded, tends to increase the cost. On the other hand, where greater locking strength is necessary to insure against lateral movement, this form might be preferred.

FIG. 13 shows a graph relating to "Teflon" TFE fibers which has been published by the Industrial Merchandising Section, Textile Fibers Department, E. I. du Pont de Nemours & Co. (Inc.), Wilmington, Del. This graph shows why it is possible in bearings of the type with which this present invention is concerned to increase the load per square inch and thereby to obtain a lower coefficient of friction. Since the load will ordinarily be more or less constant, the increase in load per unit area may be obtained by reducing the supporting surface area. The stability factor may be retained by spreading the load carrying areas generally over the entire surface of the base plate.

A modification is shown in FIGS. 14 and 15 which in principle is the same as the construction of FIGS. 1, 2 and 3, the difference being, however, that the raised portions instead of being discontinuous as are the posts of FIGS. 1, 2 and 3, present a continuous plane upper surface and the lower areas instead of being continuous are discontinuous.

In FIGS. 14 and 15 the pressure plate 8 rests on the fabricated sheet 51 which in turn is supported by the plane upper surface 52 of the base plate 2. Base plate 2 has in its surface a large number of depressed or lower areas 54 which may be in plan of any suitable shape such as round, rectangular, etc. The raised area 52 is a continuous plane surface with the depressions 54 spread thereover according to a predetermined pattern.

The fabricated sheet 51 has been initially compressed over its entire area to some uniform increased density and in the process, the downwardly extending dimples 56 have been formed which are so located as to be positioned directly in the holes 54. By using a relatively thin fabricated sheet 51, it is possible to create dimples 56 in which the upper surface 58 will be below the top surface 52 of base plate 2. This arrangement makes it possible and practical to use some type of securing means such as the pins 60 which may be driven through the dimples 56 into previously prepared holes 62 in the base plate. The purpose of securing this type of sheet in place on the base plate is to make certain that the dimples are in the holes 54 when the pressure plate is applied. The dimples alone are adequate to prevent any lateral shifting of sheet 51.

Thus, in the construction of FIGS. 14 and 15, control of the coefficient of friction remains possible by varying the area of the holes 54 thereby to vary the area of the surface 52 on which the fabricated sheet rests. No variation in the location or size of the dimples 56 is necessary as they are small enough to fit within all sized holes with regardless of area would preferably be of constant depth.

The heads of the fastening means 60 will be below the surface 52 of plate 2, so that the plate 8 will be supported solely by sheet 51 no matter how thin the sheet becomes from wear. It is to be understood, however, that, if preferred holes 54 may extend completely through plate 2 in which case the pins 60 would not be used.

The holes 48 in FIG. 12 may be filled with lubricant if thought desirable. Likewise, additional lubricants such as grease, graphite, oil, etc., may be applied to the surface of the sheet that is in sliding engagement with the pressure plate. The lubricant or corrosion inhibiting medium could be applied to those fabricated areas that are not under compression. These areas may then act as supply sources to feed the lubricant or medium to the moving smooth surface of the pressure plate to lubricate the same and to prevent corrosion. The depressions in the base plate under the non-compressed areas could receive surplus lubricant and thus act as reservoirs.

FIGS. 16, 17, 18 and 19 show, without limitation, a number of alternative configurations of supporting surfaces which while not lying in a common plane, still have the capability of supporting the load through the medium of the fabricated sheet fully as effectively as if the supporting surfaces all resided in a common plane. While the extent of the compression of the sheet at any unit of area might vary somewhat from the extent of the compression of the sheet at any other unit of area at a greater or lesser height above the adjacent lower areas of the plate which do not support the sheet at all, nevertheless the collective supporting effect of all areas of greater or lesser height that are engaged by and compress the fabricated sheet in varying degree is the same as if all of the supporting areas were in a common plane.

Figure 16:
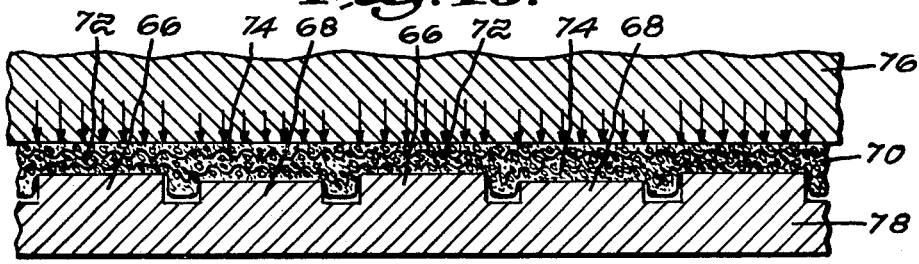
FIGS. 16, 17, 18 and 19 show other modifications of supporting surfaces which do not lie in a common plane but which collectively act in a uniform manner the same as if the surfaces were in a common plane.

In FIG. 16, the posts 66 are somewhat higher than posts 68 so that the sheet 70 is more compressed at 72 than at 74. The vertical arrows indicate this difference in the loading of the sheet. Collectively, however, the load 76 is supported by post areas which are less than the area of the base plate 78. The post areas can be changed to vary the desired coefficient of friction.

Figure 17:
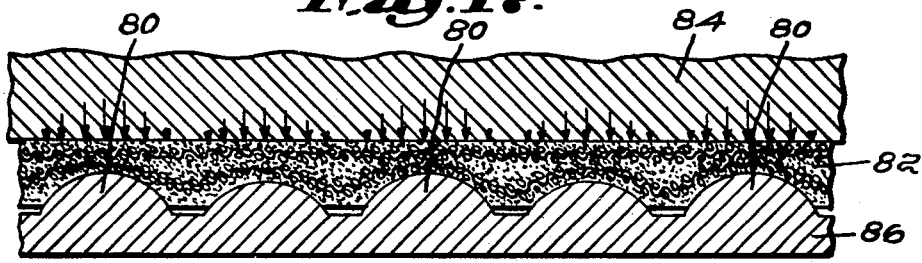

In FIG. 17, the supporting areas are in the form of oval domes 80 causing non-uniform but still effective compression of sheet 82 by load 84. The arrows above the domes indicate the varying incremental pressures applied by the load 84 to sheet 82. The effective total supporting areas of dome 80 are less than the total area of base plate 86 whereby variation of the supporting areas may be made to control the coefficient of friction.

Figure 18:
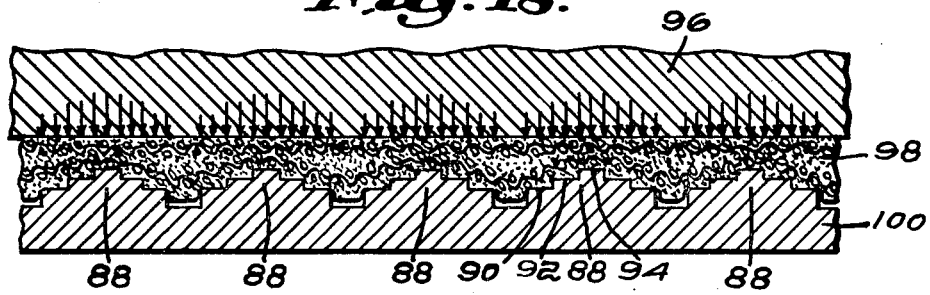
Figure 19:
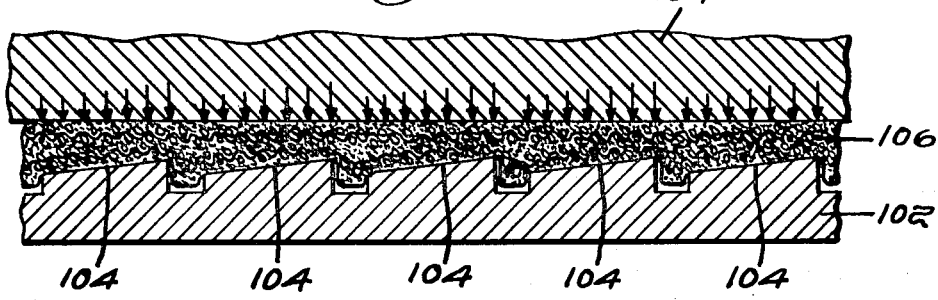

In FIG. 18, the supporting posts 88 are comprised of concentric annular flat rings 90, 92 and a small raised center area 94. These areas collectively support the load 96 through sheet 98. The supporting areas of the base plate 100 may be varied to control the effective coefficient of friction through the averaging of the loads over the supporting surfaces. The arrows indicate the variation in loading at the individual areas which total less than the area of the base plate. In FIG. 19, the posts of base plate 102 have parallel sloping top surfaces 104 which effectively support the load 104 through the non-uniformly limited compressed areas of sheet 106. The arrows suggest the localized differences in loading of the tops of the posts. The effective load carrying areas total less than the area of base plate 102, so by changing the areas of surfaces 104, the coefficient of friction may be varied.

In FIGS. 16, 17, 18 and 19, it is clear that the posts in the various forms shown all adequately anchor the fabricated sheets against lateral movement.

Figure 20:
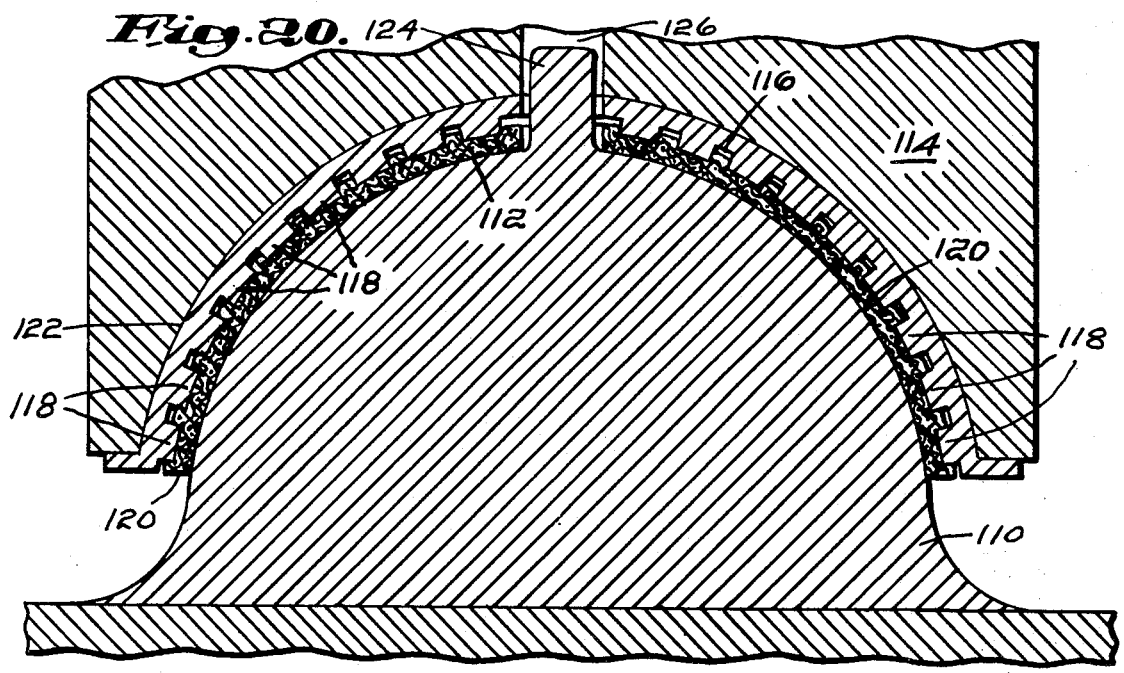
FIG. 20 shows still another modification in vertical cross section in which the smooth load carrying surface that slides on the fabricated sheet is a portion of a sphere and the posts on the other member have their supporting surfaces lying in a corresponding spherical surface of greater radius with the load carrying sheet locked against lateral movement by the indenting therein of the posts.
Figure 21:
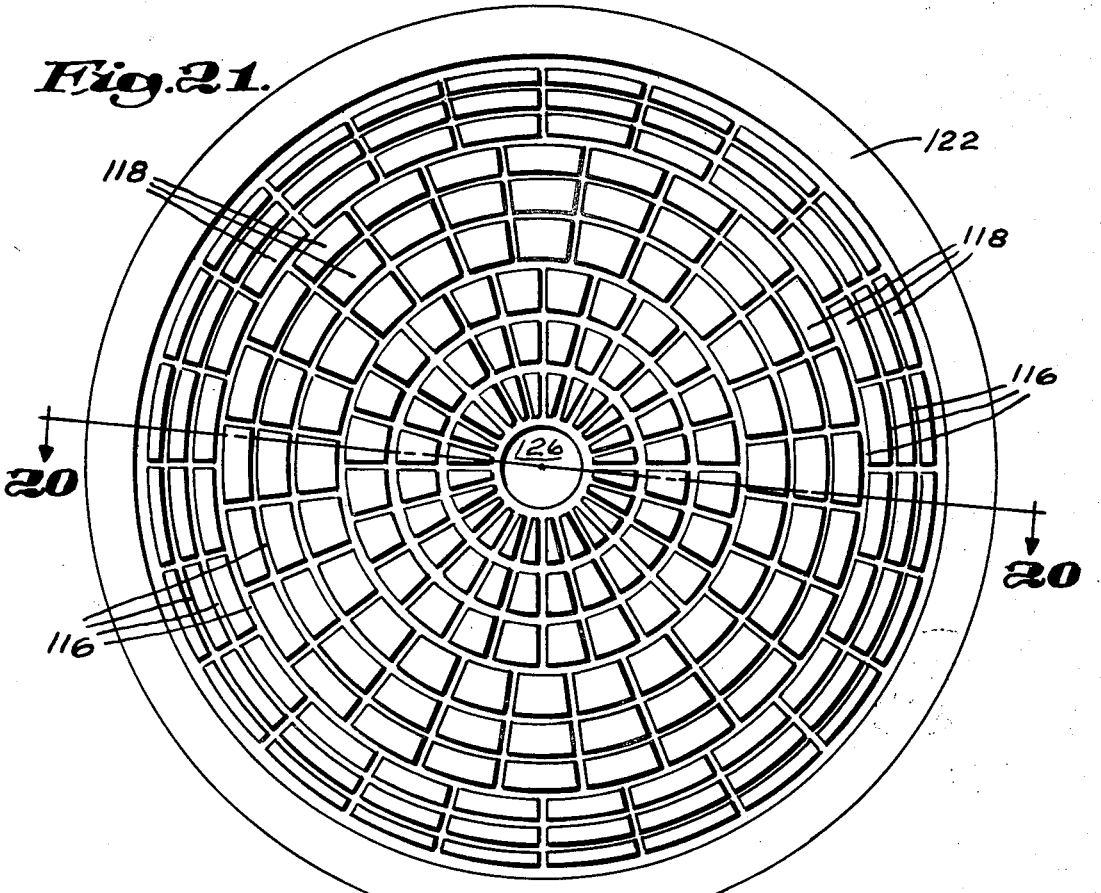
FIG. 21 is a bottom plan view of the concave upper part of FIG. 20.

FIGS. 20 and 21 show still another embodiment of the invention. Here the supporting base member 110 has an upper load supporting surface 112 which is part of a sphere. The upper member 114 is spherically concave as at 116 and of slightly larger radius than the base. A multitude of posts 118 extend inward from the concave member 114 and engage the outer surface of the intermediate fabricated TFE sheet 120, the inner surface of which rests on the smooth convex supporting surface 112.

The load carrying faces of posts 118 may reside in a spherical surface or they may be somewhat irregular as suggested by the posts 66 and 68 in FIG. 16, or posts 104 in FIG. 19.

The objective, as in all of the species disclosed herein, is to provide posts 118 which when the load is applied will indent themselves into one side of sheet 120 to preclude lateral movement of the sheet and the compressed areas of the fabricated sheet between the faces of posts 118 and the convex surface 112 will support the load. Since the total effective area of the post faces is substantially less than the total area of the concavity 116, it is obvious that by varying the area of the faces of posts 118, thereby to vary the load on the compressed areas of the sheet 120, the coefficient of friction can be controlled the same as in the other forms of the invention.

In the form appearing in FIGs. 20 and 21, the posts are shown as part of the upper member 114, but, as pointed out previously, it is a matter of convenience whether the posts be placed in the upper or lower member.

Preferably, the upper member 114 is made by casting a generally hemispherical member 122 which will include the posts 118 arranged according to any convenient pattern, one of which is shown in FIG. 21. Alternatively, the posts 118 could be formed in the inner surface of member 122 by machining.

For ease in assuring proper assembly of the parts, the base 110 may include a locating pin 124 adapted to fit with ample clearance within an aperture 126 in upper assembly 114. Since the relative rotative movement of upper element 114 with base 110 is limited, the post 124 does not impede the contemplated slow sliding movement of the parts.

The fabricated TFE sheet 120 may be readily constructed to semi-spherical shape by cutting a flat TFE sheet into a plurality of generally pie shaped sections and then sewing together or otherwise connecting the radial edges of an appropriate number of sections. The sheet 120 before installation and the application of the load does not need to be exactly the shape of base 110 as it has sufficient inherent elasticity and flexibility to conform to the upper and lower surfaces when the load is applied.

When the term raised portions or posts is used in the claims, it is intended to encompass all forms of raised elements, whether continuous or discontinuous, which carry the load imposed thereon acting through the fabricated sheet and which indent themselves in the fabricated sheet or enter into openings in the fabricated sheet to anchor the sheet against transverse movement with respect to the posts.

The fabricated sheet as shown in all species in the drawings, and as above described, is sufficiently thin so that the total load is always supported by a total compressed area of the sheet that is substantially equal to the total projected area of the supporting raised areas (as in FIGS. 1, 2, 3, 4, 5, 6, 7, 8, 9, 10, 11, 14, 16, 17, 18, 19, 20 and 21) or substantially equal to the total area of the supporting lower areas (as in FIG. 12).

The spacing of the raised areas and the lower areas is such that the total load is not distributed over the total area of the sheet. Instead, the load is carried substantially entirely by the compressed parts of the sheet positioned against the limited sheet supporting areas. Of course, the smooth load plate whether flat, cylindrical or spherical is in engagement with the entire surface of the sheet but the pressure between the plate and the sheet at the areas where the sheet is unsupported on the side of the raised areas is negligible and has little or no frictional resistance to movement of the plate thereover. The frictional resistance to plate movement resides substantially entirely at the surfaces of the compressed areas of the sheet engaged by the smooth load plate.

Furthermore, while the supporting surfaces for the fabricated sheet such as the tops of the circular posts in FIGS. 1, 2 and 3, and the tops of the non-circular posts as in FIGS. 4, 5, 6, 7, 9 and 14 all are shown as lying in a common plane, it is to be understood that the supporting surfaces do not necessarily have to lie in a single common plane or surface, but may lie in a plurality of planes or surfaces as in FIGS. 8, 10, 16, 17, 18 and 19, in non-planar surfaces as in FIG. 11, or in curved or spherical surfaces as in FIGS. 20 and 21 which surfaces collectively act as if they were arranged to be in a single plane or surface and which are, in all cases, substantially less in area than the total area of the base plate.

From the foregoing, it is to be understood that when it is stated in the claims that the supporting areas or surfaces are in a common plane, such language includes within its scope supporting areas which may lie in a common plane or in a non-planar surface or its substantial equivalent, such as a plurality of surfaces of more or less the same height above the non-supporting adjacent areas which surfaces collectively support the load and which penetrate one side of the fabricated sheet sufficiently to anchor it against lateral shifting and which surfaces are capable of being varied in area in relation to the total area of the base plate to give the desired control over the coefficient of friction.

When the term "fabricated sheet of "Teflon" TFE fibers or the like" is used in the claims, it is intended to include a sheet made solely of "Teflon" TFE fibers or equivalent, or a sheet which is a composition of such fibers and another material or materials, or a sheet of another material or materials which includes on its surface at least "Teflon" resin, provided that those controlled surface areas of such composition sheet that are under pressure will behave substantially in the same manner as a sheet fabricated solely of "Teflon" fibers or equivalent, namely, that the coefficient of friction will be reduced as the pressure increases and that the compressed areas will be laterally stable.

It is intended to cover all changes and modifications of the examples of the invention herein chosen for purpose of the disclosure which do not constitute departures from the spirit and scope of the invention.

I claim:

1. Means for supporting a load in a manner in which the load may move with relatively low frictional resistance, said means comprising a first plate having raised portions providing raised areas and lower portions providing lower areas adjacent said raised areas, a fabricated sheet of "TEFLON" TFE fibers or the like resting on one of the said areas of said first plate whereby when a load is applied to said sheet by a second plate having a smooth surface, said load will be supported substantially entirely by the said one areas of said first plate against which the said sheet initially rested and by the compressed areas of said sheet thereagainst, said load supporting areas lying in a common plane and comprising a much smaller percent of the total area of said first plate than the percent of the load supported by said supporting compressed areas, and said sheet will be anchored against lateral movement on said first plate by co-action of said raised portions and those parts of said sheet that are below the level of said raised areas at said lower areas after the said load has been applied.

2. Means as set forth in claim 1, said fabricated sheet being sufficiently porous at the uncompressed areas to be able to receive and hold a lubricant for transfer to the surface of said load plate engaged thereby.

3. Means as set forth in claim 1 in which said sheet is imperforate and said raised portions are in the form of short posts having end surfaces which comprise said raised areas and which support said load through said sheet.

4. Means as set forth in claim 1 in which said raised portions are in the form of a plurality of ribs extending crosswise of the direction of movement of said load.

5. Means as set forth in claim 1 in which said sheet is imperforate and said raised portions are continuous and comprise the raised areas which support said load through said sheet and said lower areas are discontinuous.

6. Means as set forth in claim 1 said fabricating sheet having a plurality of openings therein matching the pattern of said raised portions so that said raised portions are positioned in said openings, that part of the total area of said first plate bearing the load through said compressed sheet being the said lower areas adjacent said raised portions.

7. Means as set forth in claim 1 in which said sheet is imperforate and said raised portions are in the form of short posts whose end surfaces are of substantially the same surface area and which comprise said raised areas which support said load through said sheet, said posts spaced according to a pattern on said first plate.

8. Means as set forth in claim 1, said first and second plates and said sheet between said plates being substantially hemispherical.

9. Means for supporting a load in a manner in which the load may move with relatively low frictional resistance, said means comprising a first plate having raised portions providing raised areas and lower portions providing lower areas adjacent said raised areas, a fabricated sheet of "TELFON" TFE fibers or the like resting on said raised areas of said first plate whereby when a load is applied to said sheet by a load plate having a smooth surface, said load will be supported substantially entirely by said raised areas against which the said sheet initially rested and by the compressed areas of said sheet thereagainst, said load supporting areas lying in a common plane and comprising a much smaller percent of the total area of said first plate than the percent of the load supported by said supporting compressed areas, and said sheet will be anchored against lateral movement on said first plate by the coaction of said raised portions and those parts of said sheet extending below the level of said raised portions at said lower areas after the said load has been applied.

10. Means as set forth in claim 9, said fabricated sheet being sufficiently porous at the uncompressed areas to be able to receive and hold a lubricant for transfer to the surface of said load plate engaged thereby.

11. Means as set forth in claim 9 in which said sheet is imperforate and said raised portions are in the form of short posts having end surfaces which comprise said raised areas and which support said load through said sheet.

12. Means as set forth in claim 9 in which said sheet is imperforate and said raised areas are in the form of short posts of substantially the same surface area and which comprise said raised areas which support said load through said sheet, said posts spaced according to a pattern over said base plate.

13. Means as set forth in claim 9 in which said sheet is imperforate and said raised portions are in the form of a plurality of ribs extending cross-wise of the direction of said movement of said load.

14. Means as set forth in claim 9, said first plate and said load plate and the said sheet between said plates being substantially hemispherical.

15. Means for supporting a load in a manner in which the load may move with relatively low frictional resistance, said means comprising a first plate having a plurality of posts of substantially uniform height providing raised areas on their upper ends with lower areas therebetween, said raised areas lying in a common plane, a fabricated sheet of "TEFLON" TFE fibers or the like resting on said posts whereby when a load is applied to said sheet by a load plate having a smooth surface, said load acting through said sheet will be supported on the raised areas of said posts thereby to produce localized compressed areas in said sheet between said raised areas and said load plate and said sheet will be anchored against lateral movement on said first plate by the partial entry of said posts into said sheet.

16. Means as set forth in claim 15, said fabricated sheet being sufficiently porous at the uncompressed areas to be able to receive and hold a lubricant for transfer to the surface of said plate engaged thereby.

17. Means as set forth in claim 16, the height of said posts being such that when said sheet is compressed by said load against said posts, said sheet will also engage said lower areas but with less pressure than that against said posts.

18. Means as set forth in claim 15 in which said posts are of relatively large horizontal dimensions in relation to their height and the sheet engaging surfaces of said posts are non-planar.

19. Means as set forth in claim 15 in which said sheet is imperforate and said posts are spaced according to a pattern over said first plate.

20. Means as set forth in claim 15, said first plate and said load plate and the said sheet between said plates being substantially hemispherical.

21. Means for supporting a load in a manner in which the load may move with relatively low frictional resistance, said means comprising a first plate having a continuous raised plane area broken by a plurality of holes which define lower areas and spaces thereabove arranged according to a predetermined pattern, a fabricated sheet of "TEFLON" TFE fibers or the like resting against said raised area whereby, when a load is applied to said sheet by a load plate having a smooth surface, said load acting through said sheet will be supported by said raised area and there will be produced a compressed area in said sheet corresponding to said raised area and said sheet will be anchored against lateral movement on said first plate by the location of at least some of the thickness of said sheet in the said spaces above said lower areas.

22. Means as set forth in claim 21, said fabricated sheet being sufficiently porous at the uncompressed areas above said holes to be able to receive and hold a lubricant for transfer to the surface of said load plate engaged thereby.

23. Means as set forth in claim 21 in which said sheet has been preformed to have downwardly extending dimples located on said sheet at positions to be received in said holes.

24. Means as set forth in claim 23 in which the upper concave surface of said dimples will be below the plane of the surface of said raised area.

25. A sliding bearing for heavy loads comprising an upper load plate with a flat smooth under surface, an intermediate layer in the form of a fabricated sheet of "TEFLON" TFE fibers or the like, and a bottom base plate engaging and supporting the intermediate layer from below, said bottom base plate comprised of short closely spaced posts with flat upper surfaces relatively large in relation to the post height, said posts arranged according to a pattern, the upper surfaces of said posts constituting the sole supporting areas for said intermediate layer, said posts acting to secure the said intermediate layer against lateral movement.

* * * * *